(12) United States Patent
Hirschmann et al.

(10) Patent No.: US 6,308,404 B1
(45) Date of Patent: Oct. 30, 2001

(54) APPARATUS AND METHOD FOR LIFTING TWO AXLES ONTO A VEHICLE CHASSIS

(75) Inventors: David F. Hirschmann, Romeo; Anna Hui, Rochester Hills, both of MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 09/351,562

(22) Filed: Jul. 12, 1999

(51) Int. Cl.[7] ........................................... B23P 19/00
(52) U.S. Cl. .............................. 29/822; 29/791; 29/430; 29/824
(58) Field of Search ............................ 198/346, 346.3, 198/468.8, 463.2; 414/255, 256, 427, 662, 667; 29/791, 822, 823, 824, 430; 254/122, 124, 133, 134; 269/71

(56) References Cited

U.S. PATENT DOCUMENTS

| 3,968,559 | | 7/1976 | Karlsson . | |
|---|---|---|---|---|
| 4,257,158 | * | 3/1981 | Casutt et al. | 29/824 |
| 4,597,352 | * | 7/1986 | Norminton | 114/254 |
| 4,646,915 | | 3/1987 | Ohtaki et al. . | |
| 4,734,979 | | 4/1988 | Sakamoto et al. . | |
| 4,827,598 | | 5/1989 | Sakamoto et al. . | |
| 4,893,402 | | 1/1990 | Hirasaka et al. . | |
| 4,924,996 | | 5/1990 | Svensson et al. . | |
| 4,928,386 | | 5/1990 | Schupp et al. . | |
| 4,965,981 | * | 10/1990 | Kikuchi | 53/142 |
| 5,027,502 | * | 7/1991 | Sakamoto et al. | 29/783 |
| 5,110,153 | * | 5/1992 | Kallansrude et al. | 280/707 |
| 5,322,156 | * | 6/1994 | Kakita et al. | 198/463.3 |

FOREIGN PATENT DOCUMENTS 933352    8/1963    (GB) .

* cited by examiner

Primary Examiner—Christopher P. Ellis
Assistant Examiner—Jeffrey A. Shapiro
(74) Attorney, Agent, or Firm—Lawrence J. Shurupoff

(57) ABSTRACT

A pair of axles are mechanically lifted onto the underside of a vehicle chassis to facilitate an axle-mounting process. The lifting action is achieved with a scissors jack that is powered by a hydraulic cylinder supplied with hydraulic fluid from an accumulator. The accumulator is initially charged by a hydraulic pump that is driven by an air motor.

11 Claims, 4 Drawing Sheets

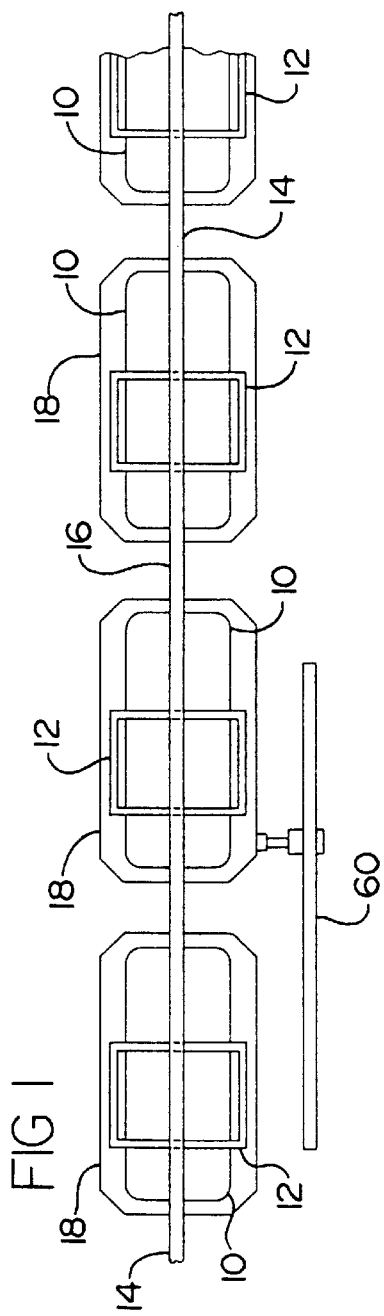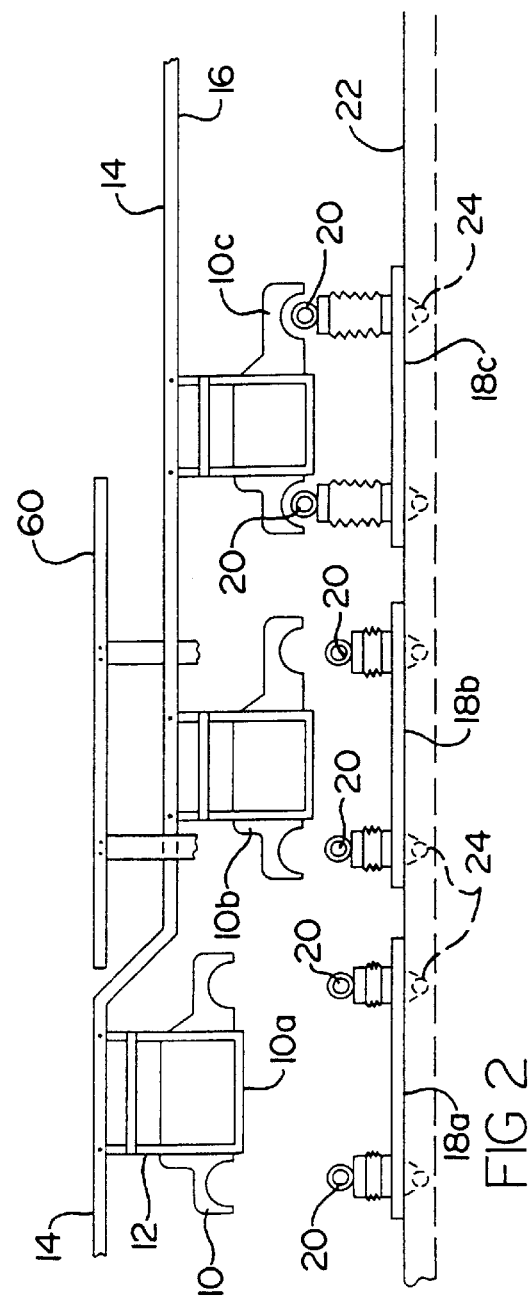

APPARATUS AND METHOD FOR LIFTING TWO AXLES ONTO A VEHICLE CHASSIS

BACKGROUND AND SUMMARY OF THE INVENTION

This invention relates to an apparatus and method for lifting two axles onto the undersurface of an automotive vehicle chassis while the chassis is being moved and supported by an overhead conveyor. The invention is particularly applicable for use in a vehicle assembly process employing a moving assembly line.

In some prior art vehicle assembly systems, mechanical lift systems have been employed for lifting two axles onto the undersurfaces of a moving vehicle chassis, so that workers on a moving platform can fasten the axles to the chassis without having to exert any human lifting forces on the axles. Each axle typically weighs between two hundred and three hundred pounds, so that mechanical lift systems greatly simplify and facilitate the operation of connecting the axles to the moving vehicle chassis.

Prior art axle lift systems have been powered by electrical power mechanisms that received electrical power through an electrical cable running from a stationary power source along the factory floor to the movable worker-support platform. In another arrangement electrical power was supplied through a fixed rail on the factory floor. In such arrangements the electrical supply system poses a human safety problem, since there is a danger that humans or various fluids can, in some circumstances, come into contact with the electrical power supply components.

Specific features of the invention will be apparent from the attached drawings and description of an illustrative embodiment of the invention.

BRIEF DESCRIPTION OF THE DRAWINGS

FIG. 1 is a fragmentary top plan view of a vehicle chassis conveyor system that can be utilized in the practice of the invention.

FIG. 2 is a side elevational view of the FIG. 1 conveyor system.

DESCRIPTION OF THE PREFERRED EMBODIMENT OF THE INVENTION

Figure 3:
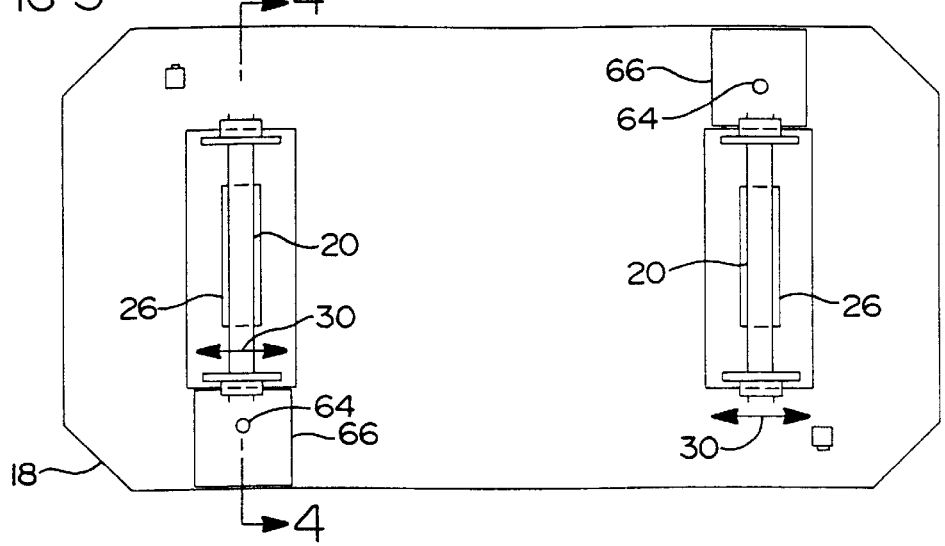
FIG. 3 is an enlarged top plan view of a worker-support platform that is used in the FIG. 1 conveyor system.

FIGS. 1 and 2 show a row of individual vehicle chassis 10 individually supported on cradles 12 that are suspended from an overhead conveyor 14. Conveyor 14 includes a slotted rail 16 that encloses a driven chain, whereby the cradles 12 are moved along the rail in a left-to-right direction.

The invention is more particularly concerned with a row of worker-support platforms 18 moveable in synchronism with the overhead conveyor chain, so that each platform 18 has substantially zero motion relative to the associated vehicle chassis. Human technicians standing on a worker-support platform 18 are able to fasten two vehicle axles 20 to the undersurface of an associated vehicle chassis after the axles have been mechanically lifted into close proximity to the chassis undersurface.

FIG. 2 shows one vehicle chassis 10a elevated an appreciable distance above two axles on the leftmost platform 18a. A second vehicle chassis 10b is in a lowered position above a second platform 18b, with axles 20 spaced a considerable distance below the vehicle chassis. A third vehicle chassis 10c is advanced to a position wherein the associated axles 20 have been mechanically lifted onto the undersurface of the vehicle chassis, such that human workers on platform 18c are enabled to mount the axles to the chassis, while the chassis and platform are moving along the respective conveyors.

The various platforms 18 may be connected to a chain conveyor located underneath floor surface 22, such that each platform moves at the same speed as the overhead chassis. Each platform 18 can be supported by means of wheels 24 located in suitable tracks located on or below floor surface 22.

Figure 4:
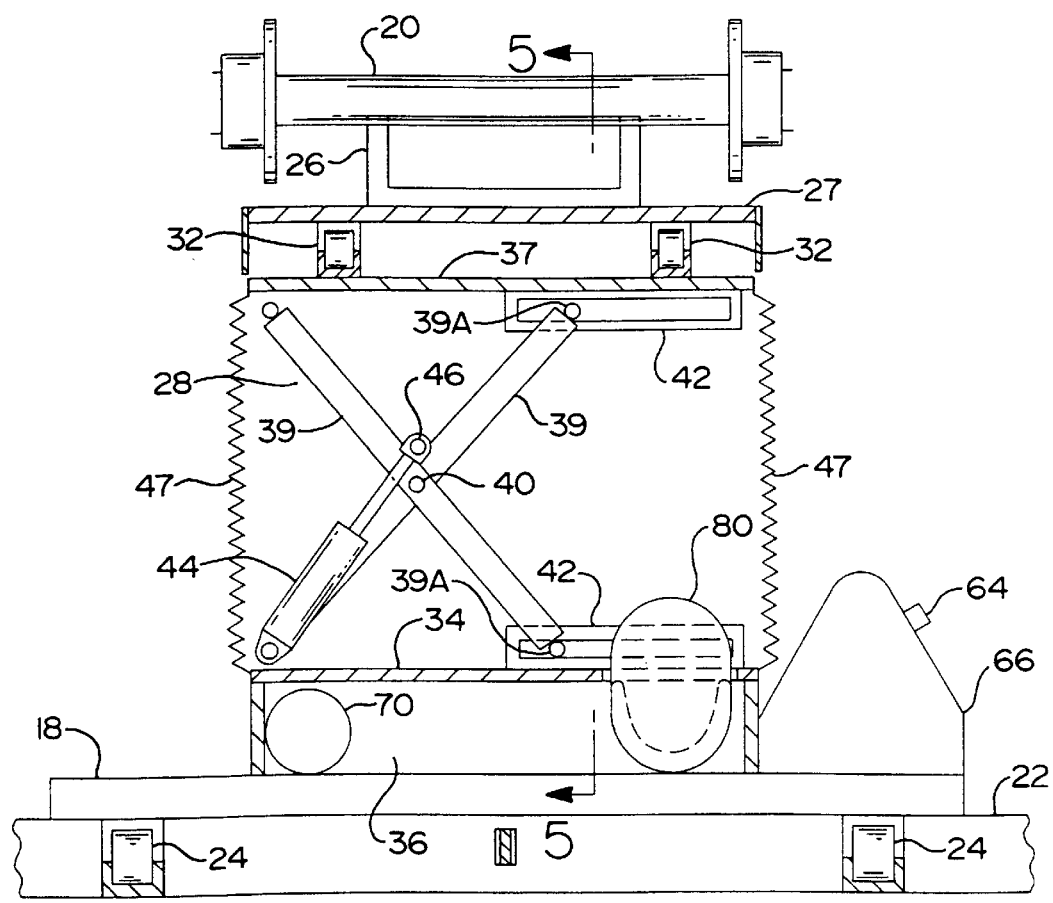
FIG. 4 is a transverse sectional view taken on line 4—4 in FIG. 3.
Figure 5:
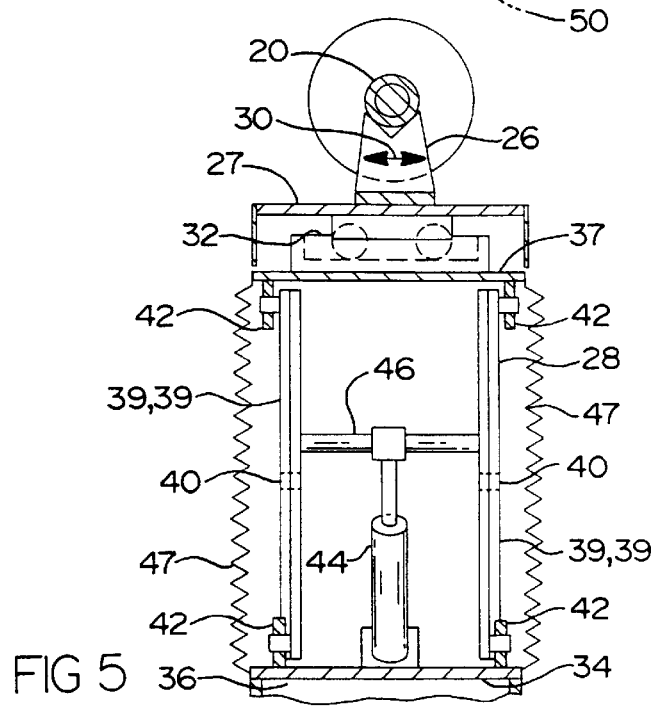
FIG. 5 is a sectional view taken on line 5—5 in FIG. 4.

The present invention is concerned particularly with the mechanisms for lifting axles 20 from the lowered position to the raised position on the undersurface of the vehicle chassis. As shown in FIGS. 3 through 5, each axle 20 is supported on a carrier 26 that includes a flat plate 27 mounted on a jack structure 28 for limited slidable motion in the arrow 30 direction by means of tracks 32. Such limited slidable motion enables the human worker to shift the axle into proper position for easier fastening of the axle to the vehicle chassis.

Each jack structure 28 comprises a lower stationary wall 34 overlying a hardware compartment 36, and an upper wall 37 that can move up or down to raise axle 20, or return downwardly, to enable carrier 26 to receive the next axle.

The various worker-support platforms are linked together to form an endless train that can be moved along an endless path into or out of vertical registry with the vehicle chassis supported by overhead conveyor 14. Axles 20 are loaded onto individual carriers 26 while each respective platform 18 is in a remote location along the endless chain driven path.

Each jack structure is a scissors jack that includes two sets of crossed arms 39 pivotably connected by a pivot means 40. The rightmost ends of arms 39 have rollers 39A that move in the tracks 42 secured to walls 34 and 37, whereby the scissors structure is enabled to operate in the intended fashion.

Each jack structure 28 is operated by a hydraulic cylinder 44 trained between lower wall 34 and a transverse rod 46 spanning the two sets of arms 39. A flexible bellows 47 is attached to the edges of walls 34 and 37 to enclose and protect the jack structure from contaminates. The illustrated jack structure advantageously provides four widely spaced support points for wall 37, so that axle carrier 26 has a desirable stability and a good safety factor.

Figure 7:
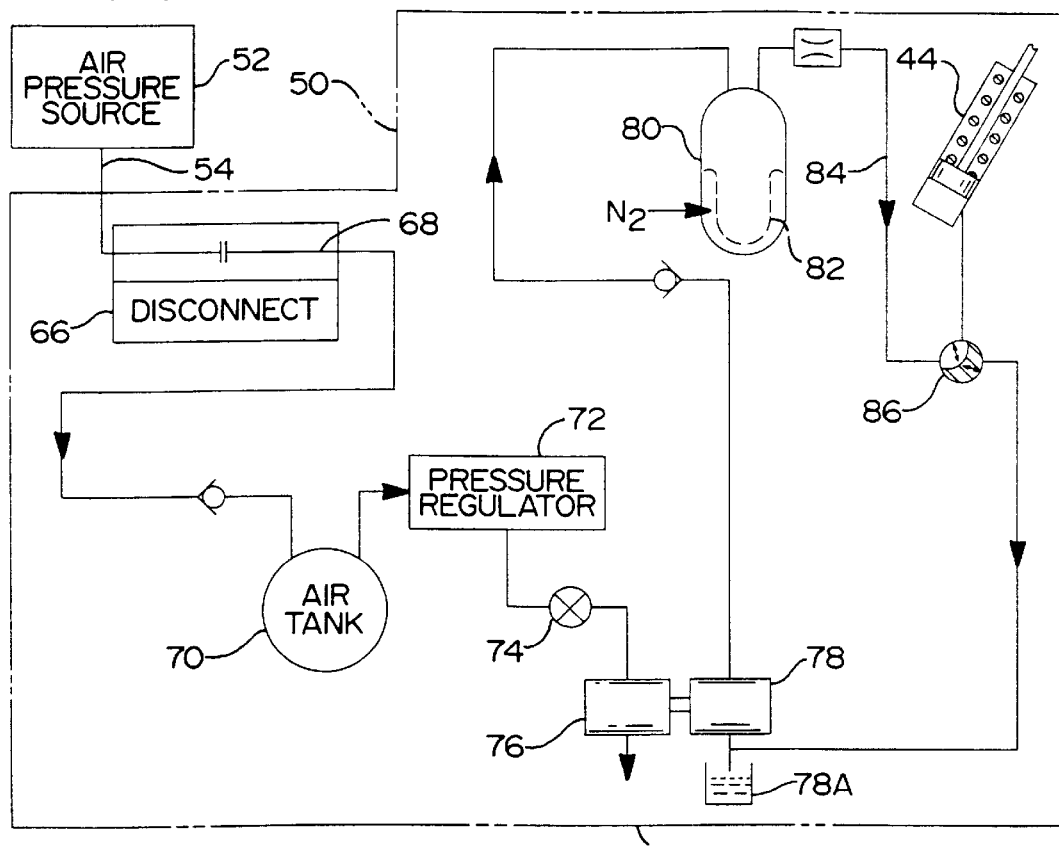
FIG. 7 is a schematic illustration of an air-hydraulic power mechanism that can be employed on the FIG. 3 worker-support platform.

FIG. 7 schematically illustrates a non-electric mechanism for supplying hydraulic fluid to each hydraulic cylinder 44. The FIG. 7 mechanism includes an on-board system represented by numeral 50, and a remote air pressure source 52 for supplying pressurized air to the on-board system. The term "on board" refers to an air-hydraulic system carried on each platform 18, primarily in hardware compartment 36. The term "remote air pressure source" refers to a source 52 located away from each platform 18. There are two remote air pressure sources for the system, one for each hydraulic jack on each platform 18. Each platform 18 has two on-board systems 50 selectively connectable with one of the remote pressure sources 52.

Figure 6:
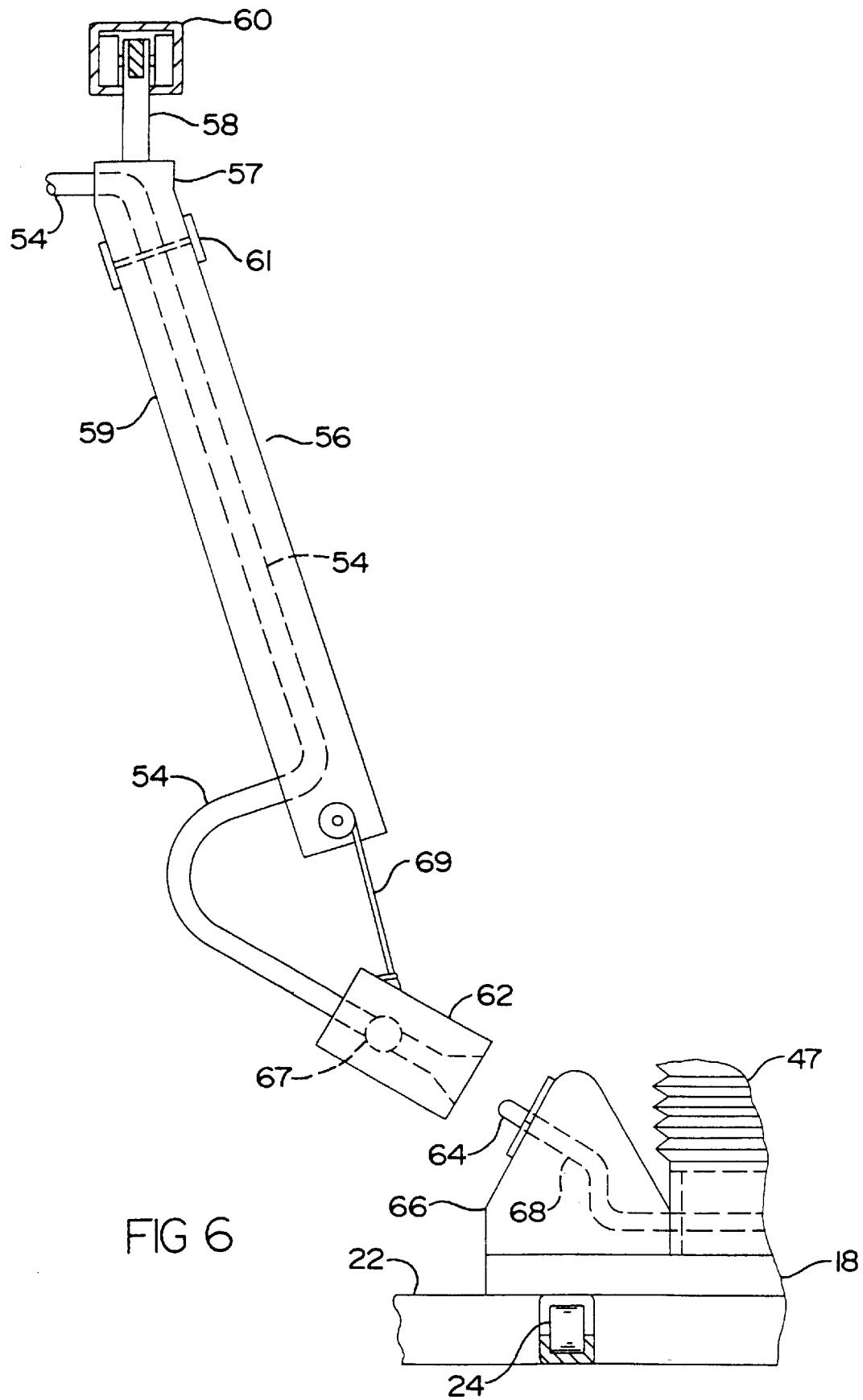
FIG. 6 is a view of an air delivery mechanism that can be employed to deliver pressurized air to the FIG. 3 platform.

A remote pressure source 52 is illustrated in FIG. 6. The source includes a pneumatic air hose 54 extended through a hollow movable arm structure 56 that is mounted on a carriage 58 movable on an overhead rail 60 that parallels the path taken by the movable platforms 18. Carriage 58 is powered by a motor, not shown, so as to move synchronously with one of the worker-support platforms 18 while the platform is moving from position 18a to position 18b in FIG. 2. During such synchronized motion of the carriage, a nozzle structure 62 connected to the lower end of hollow arm structure 56 telescopes onto a male fitting 64 that extends from a housing 66 on platform 18. Fitting 64 includes an air conduit 68 for supplying pressurized air to the on-board air system.

Nozzle structure 62 can be suspended from the lower end of arm structure 56 by an air actuated motorized reel-cable 69, such that nozzle structure 62 is guided into a desired telescopic fit on male fitting 64. After nozzle 62 is clamped to fitting 64, a valve 67 is opened so that pressurized air can flow through the nozzle into conduit 68. Air flow is continued for a predetermined time (e.g. ten seconds), sufficient to fully pressurize an on-board air tank 70 (FIG. 7). When tank 70 is fully pressurized, valve 67 is closed and reel-cable 69 is operated to withdraw nozzle 62 from male fitting 64. Carriage 58 is then returned to a starting position at the left end of overhead rail 60, where the process can be repeated for the next worker-support platform 18.

As can be seen from FIG. 1, there is an overhead rail 60, located along the side of the platform 18 pathline. Rail 60 supports an air-supply mechanism of the type shown in FIG. 6. This mechanism supplies pressurized air to the front and rear on-board air-hydraulic system 50 on each platform 18.

Each hollow arm structure 56 can include an upper arm section 57 suspended from carriage 58, and a lower arm section 59 hingedly connected at 61 to the upper arm section, whereby arm section 59 can be swung upwardly, by a fluid cylinder or motor, to a position spaced above any human traffic alongside the platform 18 train. This is a safety feature for ensuring that arm structure 56 is in a lowered condition only when nozzle 62 is required to be in registry with one of the fittings 64.

The disconnectable air pressure source depicted in FIG. 6 can be controlled by electrical operators, control systems, and programming hardware tailored to system requirements.

The on-board fluid system 50, depicted in FIG. 7, includes a pressure regulator 72 located between air tank 70 and an on-off valve 74 for controlling the flow of pressurized air to an air motor 76. The pressure regulator prevents surges in the air motor speed.

Air motor 76 mechanically drives a hydraulic pump 78 that delivers hydraulic fluid to an accumulator 80. A bladder, or diaphragm, 82 in the accumulator forms a lower chamber that is pre-pressurized with a nitrogen gas charge, whereby the hydraulic fluid is in a pressurized condition in the upper chamber of the accumulator. Air tank 70 is an optional component. In an alternate arrangement, not shown, air line 68 connects directly to pressure regulator 72.

Accumulator 80 supplies hydraulic fluid to the associated cylinder 44 through a line 84 containing a three way valve 86. In the illustrated position of valve 86, cylinder 44 is pressurized to power jack structure 28 in the up direction. In the non-illustrated position of valve 86, cylinder 44 is drained back to a sump 78A, to permit jack structure 28 to return downwardly to a starting position.

The system cycle involves various stages. While air tank 70 is being pressurized by nozzle 62, valve 74 is in a closed condition. While accumulator 80 is being pressurized, valve 74 is open and valve 86 is in the drain position (isolating the accumulator from cylinder 44). In order to operate cylinder 44 in the up direction, valve 86 is moved to the illustrated position.

The air-hydraulic system is advantageous in that no electrical power has to be transmitted into the worker-support platforms 18. Valves 74 and 86 can be manually operated. Air tank 70 is used to store the pressurized air, so that nozzle 62 needs to be connected to the on-board system for only a short period of time, typically about ten seconds. The accumulator 80 is used to provide a controlled (high pressure) flow of hydraulic fluid to cylinder 44, at any desired time in the cycle (i.e., when valve 86 is operated).

Accumulator 80 provides a controlled pressure source for hydraulic cylinder means 44 so that the seals in the cylinder have a reasonably good service life.

What is claimed:

1. Apparatus for lifting two axles onto the undersurface of a vehicle chassis while the chassis is being moved and supported by an overhead conveyor; said apparatus including a moveable worker-support platform synchronized with the conveyor so that the platform moves at the same speed as the vehicle chassis; two liftable axle carriers on said platform; two separate jacks on said platform, for moving each axle carrier up and down, whereby the axles can be lifted onto the undersurface of the chassis; a separate hydraulic means for operating each said jack; and pneumatic means for pressurizing each hydraulic means; said pneumatic means including a pressurized air source remote from said worker-support platform, an air system on board the platform, and a disconnectable conduit means for connecting said pressurized air source to said on-board air system without changing the speed of said platform.

2. The apparatus of claim 1, wherein each said hydraulic operating means includes a hydraulic accumulator means, a hydraulic cylinder mechanically connected to an associated jack, and a valve controlling hydraulic flow from said accumulator means to said cylinder means.

3. The apparatus of claim 2, wherein said air system comprises an air motor, and said hydraulic operating means comprises a hydraulic pump driven by said air motor.

4. The apparatus of claim 1, wherein each air system comprises an air motor; said hydraulic operating means comprising a hydraulic pump driven by said air motor, a hydraulic accumulator pressurized by said hydraulic pump, a hydraulic cylinder mechanically connected to an associated jack, and a valve controlling hydraulic flow from said accumulator to said cylinder means.

5. The apparatus of claim 4, wherein each pressurizable air system includes an air storage tank and a pressure regulator controlling air flow from said tank to said air motor.

6. The apparatus of claim 1, wherein each said jack is a scissors jack.

7. The apparatus of claim 1, where in each said jack is a scissors jack; each said hydraulic operating means comprising a hydraulic accumulator, a hydraulic cylinder mechanically connected to an associated scissors jack, and a valve controlling hydraulic flow from said accumulator to said cylinder means.

8. A method for lifting two axles onto the undersurface of a vehicle chassis while the chassis is being moved and supported by an overhead conveyor; said method including the steps of moving a worker-support platform in synchronism with the vehicle chassis; providing two liftable axle carriers on said platform; moving each axle carrier up and down with a separate jack, whereby the axles can be lifted onto the undersurface of the chassis; operating each jack with a separate hydraulic means; and supplying pressure to said hydraulic means with a pneumatic means; said pressure-supplying step including the sub-steps of connecting a remote air source to an air system on board the worker-support platform, and subsequently disconnecting said air source from the on-board air system without changing the speed of the worker-support platform.

9. The method of claim 8, wherein the step of operating each jack includes storing a hydraulic pressure in an accumulator, and opening a valve located between the accumulator and a jack-operating cylinder.

10. The method of claim 9, wherein the step of storing hydraulic pressure in the accumulator includes the step of delivering pressurized air to an air motor and mechanically connecting said air motor to a hydraulic pump that is in hydraulic communication with the accumulator.

11. The method of claim 10, wherein the step of delivering pressurized air to the air motor includes storing pressurized air in an air tank, and passing pressurized air from the tank through a pressure regulator to the air motor.

* * * * *